July 12, 1960
R. H. NECE
2,944,580
SIDE WALL VALVE AND METHOD OF MANUFACTURE THEREFOR
Filed Oct. 23, 1958
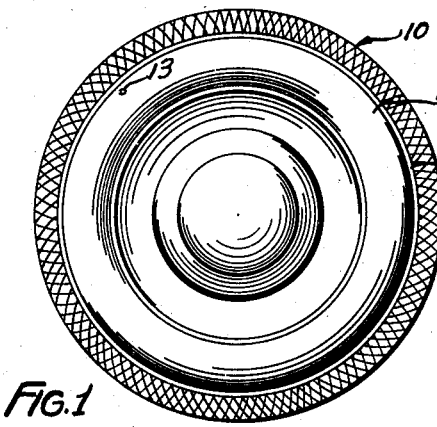
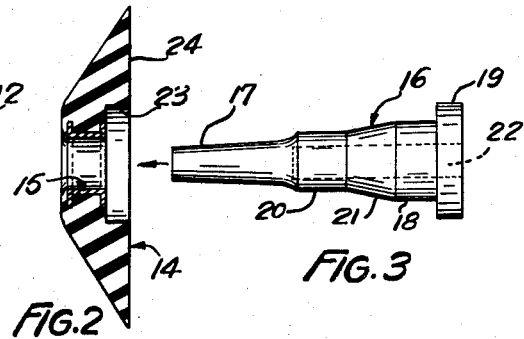
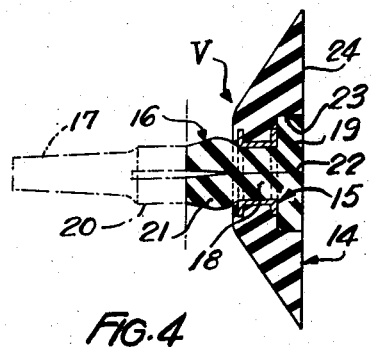
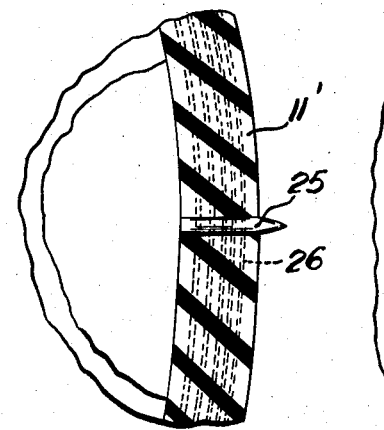
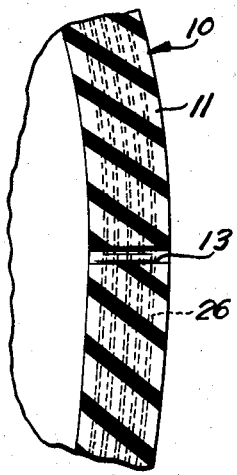
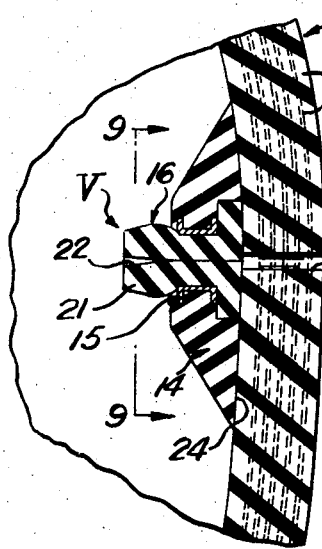
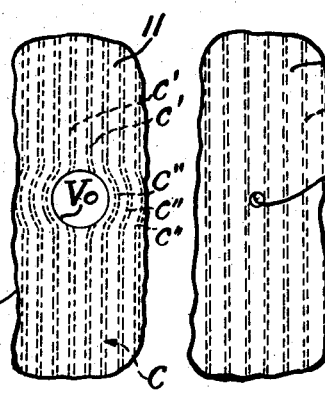
INVENTOR.
ROGER H. NECE
BY Hudson Boughton
Williams, David & Hoffmann
ATTORNEYS

2,944,580

SIDE WALL VALVE AND METHOD OF MANUFACTURE THEREFOR

Roger H. Nece, Maple Heights, Ohio, assignor to The Dill Manufacturing Company, Cleveland, Ohio, a corporation of Ohio Filed Oct. 23, 1958, Ser. No. 769,221

3 Claims. (Cl. 152—429)

The present invention relates to the construction of a tubeless tire and a side wall valve therefor, and a method of manufacturing the same.

An object of the invention is to provide a tubeless tire and side wall valve construction which will not impair the strength or decrease the useful life of the tubeless tire. One of the chief disadvantages of present day tubeless tires having side wall valves is that when the valves are assembled or mounted on the tires the reinforcing cords of the tire casings must be either ruptured or spread apart and displaced a considerable distance in order to accommodate the stems of the valves with a resultant weakening of the side walls of the tires.

It is another object of the invention to provide a side wall valve and tubeless tire construction, and a method of producing the same, wherein the reinforcing cords of the tire are not parted or displaced.

Another object of the invention is to provide a tubeless tire having a minute opening for a hollow inflating needle in a side wall thereof, which opening is controlled by a valve vulcanized, bonded or otherwise secured entirely inside the tubeless tire for controlling the flow of pressure fluid through the opening.

A still further object of the invention is to provide a novel manner of installing a valve in a side wall of a tubeless tire either during the manufacture of the tire or after the tire has already been completely cured.

The invention further resides in certain novel features of construction, and combinations and arrangements of parts, and further objects and advantages thereof will be apparent to those skilled in the art to which it pertains from the following description of the present preferred embodiment thereof described with reference to the accompanying drawings forming part of this specification and in which similar reference characters represent corresponding parts throughout the several views, and in which:

Fig. 1 is a side elevational view of a vehicle wheel with a tubeless tire embodying the present invention mounted thereon.

Fig. 2 is a detail cross-sectional detached view of the base of the side wall valve forming part of the invention.

Fig. 3 is an elevational detached view of the valve stem to be used in conjunction with the base of Fig. 2.

Fig. 4 is a sectional view of the assembled side wall valve prior to being mounted on the tire.

Fig. 5 is a fragmentary cross-sectional view of a side wall of an uncured tubeless tire carcass having a removable needlelike mold pin placed therein and illustrated on an exaggerated scale.

Fig. 6 is a view similar to Fig. 5, but showing the mold pin removed after the tubeless tire has been removed from its mold, the diameter of the remaining opening being shown of exaggerated scale.

Fig. 7 is a view similar to Fig. 6, but with the side wall valve of Fig. 4 bonded to the tire entirely within the interior thereof.

Fig. 8 is a fragmentary outer side view of the side wall of the tubeless tire of Fig. 7 with the minute opening for a hollow inflating needle formed in the side wall between the reinforcing cords thereof.

Fig. 9 is a sectional view along line 9—9 of Fig. 7, and

Fig. 10 is a view similar to that of Fig. 8, but showing the usual size opening in the side wall of the tubeless tire for the valve stem of the side wall valve and schematically illustrating how the tubeless tire reinforcing cords are ruptured or weakened because they must be forced a substantial distance apart to accommodate the valve stem.

It is to be understood that the phraseology or terminology employed herein is for the purpose of description and there is no intention to limit the invention beyond the requirements of the prior art.

Referring to Fig. 1, a pneumatic tubeless tire 10 is shown mounted on a motor vehicle wheel. The tire 10, for purposes of illustrating the invention, is of the type having a side wall 11 separated from the tread portion of the tire 10 by a scuff flange or bar 12. A needle-type sidewall valve V is mounted on the side wall 11 entirely within the tire 10 for controlling the inflation and deflation of the tire by the usual inflating needle. The side wall 11 of the tire 10, preferably adjacent to the scuff flange 12, is provided with an opening 13 of minute diameter through which the inflating needle can be inserted, as will later be explained, the opening 13 being in axial alignment with the slit in the stem of the side wall valve.

The valve V is formed of suitable rubber material and comprises three elements; a mounting disk or base 14, a rigid tubular insert or bushing 15 and a stem 16.

The stem 16 has an original length longer than is necessary to extend through and protrude beyond the thickness of the mounting disk or base 14, Fig. 4. The stem 16, when assembled with the mounting disk 14, extends through the tubular insert 15.

The stem 16 has a cylindrical flange or head 19 at its one end and an adjacent cylindrical portion 18. A conical portion 21 interconnects the cylindrical portions 18 and 20. The tapered outer end 17 of the stem 16 is provided for ease in drawing the stem 16 through the insert 15 after which it is cut off.

The stem 16 is provided with an axially extending inflating and deflating slit 22 normally held sealed by the inherent resilience of the stem material, as will be well understood.

The insert 15 is disposed about the stem 16 and has a smaller inside diameter than the diameter of the cooperating portion of the stem 16. The insert is bonded in the disk or base 14 and coaxially with a central bore in the disk or base 14. A counterbore 23 in the base 14 seats therein the flange or head 19 of the stem 16 so that the exposed terminal end face of the flange 19 is flush with a planar side face 24 of the mounting disk or base 14. The disk 14 is of frusto-conical configuration and it is bonded or secured to the inside wall of the tire 10, Fig. 7.

The side wall valve V is vulcanized or otherwise secured entirely to the inside of the tire 10 for controlling the minute needle opening 13 therein. Preferably, after the tire carcass has been roughly formed and immediately before the same is placed in a tire mold prior to curing the same, a removable needle-like metal awl or mold pin 25 is worked between the reinforcing cords and/or fabric 26, Fig. 8, of the side wall of the tire carcass, care being taken that the reinforcing cords and/or fabric 26 are not ruptured or displaced. The carcass is then placed within a mold for curing, as will be understood by those skilled in the art. In contrast, Fig. 10 is provided to show the damage that can be done by the reinforcing cords C in the wall of a tubeless tire T by forming an opening therein of substantial diameter for the usual type of side wall valve. Note that the cords C' are ruptured and the cords C" are spread or displaced a considerable distance apart.

The use of the needle-like pin 25 does not displace the cords during the forming of the minute diameter opening 13, thereby keeping the strength of the tire at its original maximum. It is recognized that after the tire is cured the minute diameter opening 13 could be formed by other methods, such as by drilling.

Once the tire 10 is removed from the mold, the pin 25 can be removed either manually or with mechanical apparatus and the minute diameter opening 13 for the inflating needle is thereby completely formed in the casing, as shown in Figs. 1 and 6.

The next step of the method involves positioning the valve V, Fig. 7, so the slit 22 is in axial alignment with the opening 13 in the tire side wall 11.

The next step consists in the vulcanizing or bonding of the valve V to the side wall 11 entirely inside the tire 10. Once the valve V is integrally connected entirely inside the tire 10, the tire is ready for use, the tire being inflated by the insertion of a hollow inflating needle through the minute diameter opening 13 and through the slit 22 of the valve V. Once the hollow needle is removed, the resiliency of the valve stem 16 is sufficient to close the slit 22, as shown in Fig. 7, to prevent the escape of the pressure fluid from the inside of the tire 10.

It will be understood that the present invention may be modified and adapted to various circumstances and conditions, and it is accordingly desired to comprehend within the purview of this invention all such modifications as are considered to fall within the scope of the appended claims.

Having thus described my invention, I claim:

1. In combination with a tubeless tire having a side wall provided with an opening therethrough of minute diameter such as to just accommodate an inflating needle and located between the juxtaposed cords of a pair of reinforcing cords in said side wall, a side wall valve comprising a base having a normally planar side and having an opening therethrough having a counterbore, a stem formed of resilient material and having a self-closing inflating and deflating slit therein, said stem being provided with a head presenting a terminal end face, said stem being secured in said opening of said base with said head seated in said counterbore and with said terminal end face flush with said planar side, said base being secured with said planar side thereof to the inner side of said side wall and with said stem extending entirely inwardly of said tire from the inner side of said side wall, said slit in said stem and the opening in said side wall being in axial alignment with each other.

2. The combination of claim 1 wherein said stem is secured in said opening in said base by a rigid tubular insert, and said base is of frusto-conical configuration for reinforcing said side wall in the area surrounding the opening therein.

3. A method for providing a side wall valve in a tubeless tire construction comprising the steps of: working a mold pin between the juxtaposed cords of a pair of reinforcing cords of the side wall of an uncured tire carcass, curing said carcass with said pin extending through the side wall thereof, removing said pin to leave a minute opening through the cured side wall and between the reinforcing cords thereof for the insertion therethrough of an inflating needle, and positioning and securing a side wall valve having a self-closing slit therethrough to the inner side of the side wall so that said valve extends entirely inwardly of said tire from said inner side and with said opening and said slit in axial alignment with each other.

References Cited in the file of this patent

UNITED STATES PATENTS

| | | |
|---|---|---|
| 1,951,565 | Sonnett | Mar. 20, 1934 |
| 2,230,879 | Bronson | Feb. 4, 1941 |
| 2,243,462 | Fageol | May 27, 1941 |
| 2,329,346 | Goff | Sept. 14, 1943 |
| 2,621,700 | Snyder | Dec. 16, 1952 |
| 2,634,785 | Tubbs | Apr. 14, 1953 |